March 20, 1928.  W. TIMSON  1,663,509

WEIGHING APPARATUS

Filed Nov. 22, 1926   2 Sheets-Sheet 1

Inventor—
William Timson

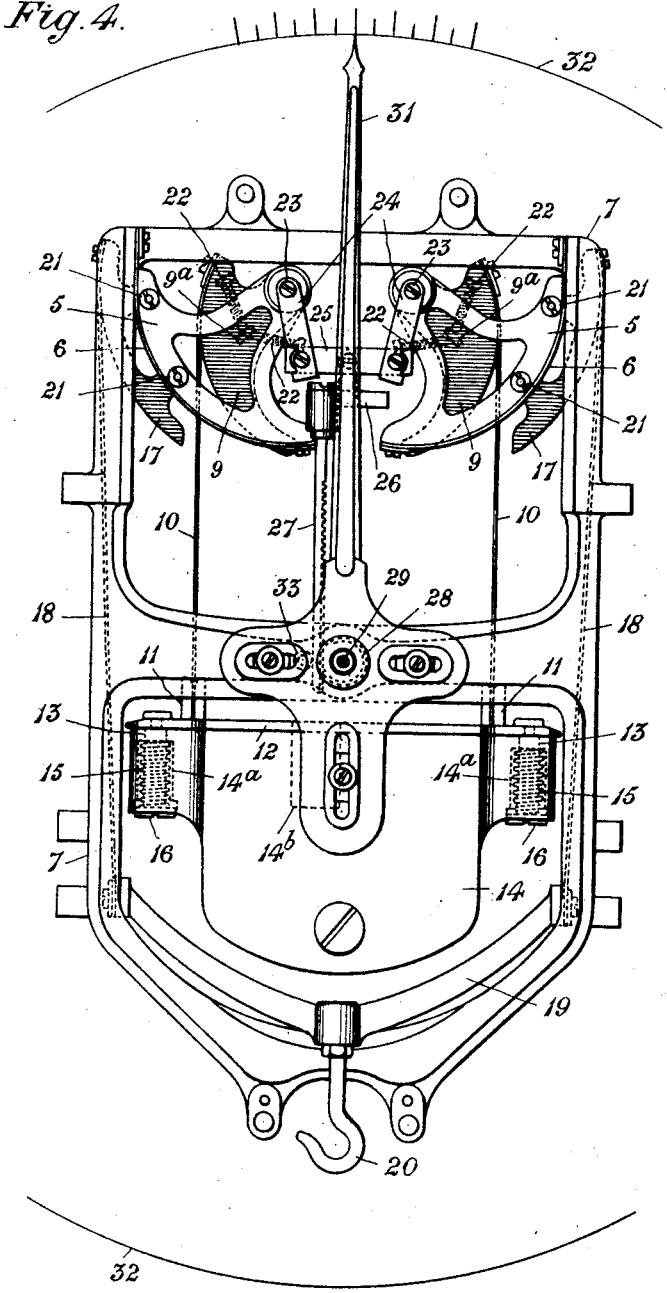

Patented Mar. 20, 1928.

1,663,509

UNITED STATES PATENT OFFICE.

WILLIAM TIMSON, OF BIRMINGHAM, ENGLAND, ASSIGNOR TO W. & T. AVERY, LIMITED, OF BIRMINGHAM, ENGLAND.

WEIGHING APPARATUS.

Application filed November 22, 1926, Serial No. 150,102, and in Great Britain May 19, 1926.

This invention has reference to improvements in or relating to weighing apparatus, and relates particularly to weighing apparatus of the kind wherein the weighing resistant is suspended by means of flexible ribbons from a pair of cam-like members which are fixed relatively to and act in conjunction with additional cam-like members which are suspended by means of flexible ribbons from a housing said additional cam-like members being adapted, upon the application of a load to the weighing apparatus, to roll bodily up the suspension ribbons the vertical displacement of the cam-like members thus obtained being caused to effect the actuation of an indicating mechanism whereby an indication of the measure of the load applied may be obtained.

In weighing apparatus of the aforesaid kind, it has heretofore been proposed to employ a single pendulous resistant freely suspended by means of flexible ribbons from a pair of cam-like members which are co-axial with but oppositely disposed relative to two additional sets of cam-like members. To one set of these additional cam-like members the pull of the load is transmitted through flexible ribbons said set of cam-like members being eccentrically disposed relative to the common axes. The other additional set of cam-like members are concentrically disposed relative to the common axes and are secured to the lower ends of flexible ribbons which are attached at their upper ends to a fixed housing the said last-mentioned set of cam-like members being adapted to roll up the fixed suspension ribbons or bands upon the application of a load to the weighing apparatus. The vertical displacement of the cam-like members is transmitted to a rack which meshes with a pinion mounted on a spindle carrying an indicating pointer or pointers adapted to register with a graduated chart or charts whereby an indication of the measure of the load can be obtained.

With weighing apparatus of the aforesaid kind it is found in practice that by reason of the opposite disposition of the resistant carrying cam-like members relative to the suspension and load cam-like members the movement of the resistant necessary to counterbalance the load is relatively large thereby tending to undesirable oscillation of the pendulous resistant and a consequential impairment of the accuracy of the indicating mechanism. Moreover the means of connecting the rack to the cam-like members has not permitted a true vertical movement of the rack thereby preventing the employment of an indicating chart having equal graduations for equal increments of weight. Further, the relatively large movement of the pendulous resistant augments the strain on the suspension ribbons and increases the possibility of fracture of the said ribbons should a load be removed from the scale suddenly.

The present invention has for its object the provision of an improved weighing apparatus of the kind herein referred to which is efficient in operation and simple in construction and wherein the aforesaid disadvantages are eliminated.

The invention consists of an improved weighing apparatus of the kind hereinbefore referred to wherein a single pendulous resistant is adapted to depend below and be suspended from a plurality of co-axial cam-like members by means of flexible ribbons characterized in that the said cam-like members are grouped on the same side of the vertical planes passing through the respective axes, the peripheries of the resistant carrying cam-like members and of the cam-like members to which the load is applied being eccentrically disposed relative to the common axes, the cam-like members co-operating with the suspension ribbons being concentrically disposed relative to the common axes the eccentric displacement of the resistant carrying cam-like members and of the load transmitting cam-like members entailing a differential motion between the several sets of cam-like members which results in the reduction of the degree of movement imparted to the resistant, the said cam-like members being connected to the rack for operating the weight indicating mechanism through a pivotal linkage which allows of the free operation of the rack in a true vertical plane thereby permitting of the employment of a weight indicating chart having equal graduations for equal increments of weight.

The invention will now be described with particular reference to the accompanying sheet of drawings wherein:—

Figure 3 is a sectional plan view illustrating the relative disposition of the several cam-like members and Figure 4 is a similar view to Figure 1 shewing the resistant and indicating mechanism in the full load position.

Figure 1:
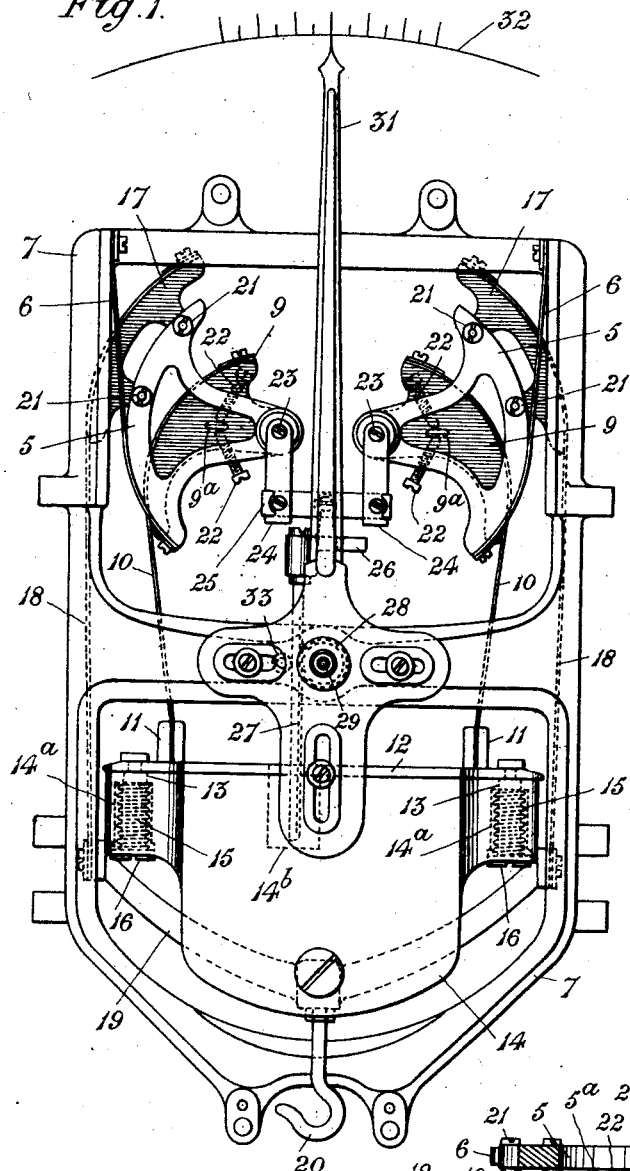
Figure 1 is a front elevation of sufficient of a weighing apparatus constructed in accordance with the invention as is necessary to an understanding of the invention, the resistant and indicating mechanism being shewn in the no-load position.
Figure 2:
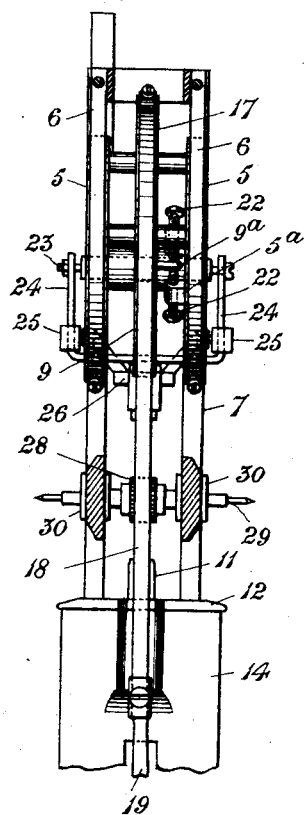
Figure 2 is an end elevation, partly in section, of a portion of the mechanism seen in Figure 1.
Figure 3:
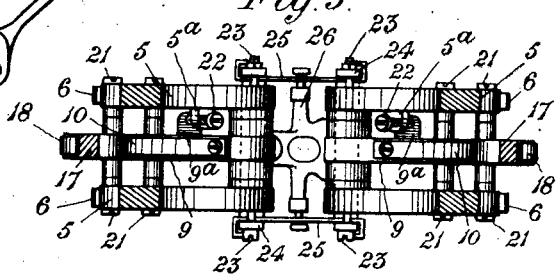

The mechanism shewn in the drawings is adapted for employment with weighing apparatus of known kind wherein the load is applied to a platform supported on a lever system having connection through a draw bar with the indicating mechanism and those portions of the weighing apparatus which are not necessary to an understanding of the invention are omitted from the drawings.

Two pairs of oppositely disposed cam-like members 5, hereinafter to be referred to as the suspension cams, are secured adjacent the lower ends of their peripheries to the lower ends of flexible ribbons or bands 6, which, at their upper ends, are anchored to a housing 7 within which the mechanism as a whole is disposed.

Co-axially mounted relative to the suspension cams 5 and fixed relative thereto are a second pair of segmental cam-like members 9, hereinafter to be referred to as the resistant cams, to the upper ends of the peripheries whereof are secured the ends of a pair of flexible ribbons or bands 10. The lower ends of the flexible ribbons or bands 10 are secured between clamps 11 formed integral with and projecting upwardly from a horizontally disposed bar 12. This bar 12 is provided adjacent the ends thereof with pins 13 which engage within cylindrical recesses 14$^a$ formed in a pendulous resistant member 14 said pins 13 having coil springs 15 concentrically disposed about the lower portion thereof. The said coil springs 15 are located within enlarged portions of the recesses 14$^a$ and abut at their upper ends shoulders formed in the said enlarged portions, the lower ends of the springs abutting the heads of screws 16. The pins 13 and screws 16 are capable of a vertical sliding motion within the recess 14$^a$ against the resistance of the coil springs 15. The coil springs 15 serve as shock absorbers and prevent the transmission of violent stresses to the flexible ribbons or bands 10.

Co-axial with the cam members 5 and 9 are provided a third pair of segmental cam-like members 17 hereinafter to be referred to as the load cams to the upper ends of the peripheries whereof are secured the upper ends of a further pair of flexible bands or ribbons 18 the lower ends whereof are secured to the extremities of a yoke 19 provided with a centrally disposed depending hook 20 to which is attached a draw-rod (not shewn) in connection with the bottom-work of a platform weighing scale or other weighing mechanism said yoke serving to transmit the pull of the load to the resistant mechanism.

The peripheries of the resistant cams 9 and of the load cams 17 are eccentrically disposed relative to the peripheries of the pairs of suspension cams 5 which are concentric with the respective axes of each set of cams.

The load cams 17 are rigidly fixed to the suspension cams 1 by means of screws 21 the position of the fixing means being initially calculated to permit of the requisite eccentric displacement of the load cams 17 relative to the suspension cams. One of each pair of suspension cams 5 is formed on its inner side with a pair of bosses 5$^a$ each of which has formed therein a tapped recess within which engages a screw 22 the shanks of the said screws 22 being inclined towards one another so that the noses thereof impinge on opposite sides of projections 9$^a$ secured to each of the resistant cams 9. The hubs of the resistant cams 9 are loosely mounted on axially disposed spindles 23 to which the pairs of suspension cams 5 are secured and hence it will be seen that by suitable manipulation of the screws 22 adjustment of the resistant cams 9 relative to the suspension cams 5 can be effected.

The ends of the axially disposed spindles 23 are pivotally connected to the arms of a pair of depending U-shaped links 24 which, in turn, are pivotally connected with a pair of cross bars 25. These cross-bars 25 have pivotal connection with a bracket 26 to which is anchored a rack bar 27 adapted to mesh with a pinion 28 fixed on a spindle 29 mounted in ball bearings 30 carried by the housing 7. Fixed upon each end of the spindle 29 is an indicating pointer 31 said pointers being adapted to register with graduated circular charts 32 in known manner. The lower end of the rack bar 27 is located within a recess 14$^b$ formed in the body of the resistant member 14. The rack 27 is maintained in mesh with the pinion 28 by means of a guide roller 33 which bears on the rear edge of the rack bar in accordance with common practice.

The eccentrically disposed pair of cams 9 and 17 are initially adjusted so that the suspension ribbons or bands 10 and 18 respectively are outwardly inclined when the mechanism is in the no-load position with the result that when a load is applied the eccentric displacement of the cam-like members 9 entails only a relatively small increase in the effective length of the flexible bands or ribbons 10 as they unwind from the peripheries of the cams 9 upon the bodily upward movement of the whole of the cams which movement obtains when the suspension cams 5 roll up the suspension bands 6 on the application of a load. This small increase in the effective length of the suspension bands or ribbons 10 only involves a small movement of the pendulous resistant 14 relative to the degree of movement given to the rack bar 27 which partakes of the whole of the vertical displacement occasioned by the suspension cams 5 rolling up the suspension loads 6 on the application of a load.

By reason of the small movement of the resistant 14 the tendency to oscillation of the said resistant is lessened and the strain on the ribbons or bands which would be occasioned by the sudden removal of a load is minimized. In addition, the eccentric setting of the cams 17 results in the pull of the load effecting a relatively large motion of the said cams 17 thus augmenting the degree of upward movement of the cams as a whole and increasing the motion of the rack 27.

The inter-connection of the sets of cams by the flexible linkage constituted by the links 24 and cross bar 25 permits of the outward displacement of the cams as a whole due to the eccentric displacement of the pairs of cams 9 and 17 without this outward displacement being communicated to the rack bar 27 and hence the said bar can reciprocate in a true vertical plane thereby enabling a chart having equal graduations for equal increments of load to be employed.

Furthermore, by reason of the bar 12 having a resilient connection with a resistant 14 the springs 15 act as shock absorbers and prevent the transmission of sudden shocks to the flexible ribbons or bands 10 whereby fracture, due to the sudden application or removal of a load from the weighing platform, is avoided.

A weighing apparatus constructed as hereinbefore described is found in practice to be more efficient and accurate than weighing apparatus of this kind hereinbefore in use.

I claim.

1. An indicating and resistant mechanism for use in connection with weighing apparatus comprising a housing, two pairs of cam-like suspension members disposed on opposite sides of the longitudinal axis of said housing, pairs of flexible ribbons secured at their upper ends to said housing and at their lower ends to the peripheries of the cam-like suspension members, a resistant carrying cam-like member fixed relatively to each pair of cam-like suspension members and having its periphery eccentrically disposed relatively to the peripheries of the cam-like suspension members, a pendulous resistant, a pair of flexible ribbons anchored at their upper ends to the periphery of the resistant carrying cam-like members and at their lower end to said pendulous resistant, a load carrying cam-like member secured relatively to each pair of cam-like suspension members and having its periphery eccentrically disposed relative to the peripheries of the cam-like suspension members, each set of cam-like members being co-axially disposed and arranged on the same side of the vertical plane passing through the common axes, flexible ribbons connected at their upper ends to the load carrying cam-like members, means connected to the lower ends of said last mentioned ribbons for transmitting the pull of the load to said ribbons, an indicating mechanism and means connected with said cam-like members for actuating the said indicating mechanism.

2. A weight indicating and resistant mechanism for use in connection with weighing apparatus comprising a housing, a plurality of cam-like members, a plurality of flexible ribbons secured at their upper ends to said housing and at their lower ends to the peripheries of said cam-like suspension members, a pair of resistant carrying cam-like members fixed relatively to the cam-like suspension members and having their peripheries eccentrically disposed relatively to the peripheries of the cam-like suspension members, a pendulous resistant, a pair of flexible ribbons anchored at their upper ends to the peripheries of the resistant cam-like members and at their lower ends to said pendulous resistant, a pair of load carrying cam-like members fixed relatively to the suspension and resistant carrying cam-like members and having the peripheries thereof eccentrically disposed relatively to the peripheries of the cam-like suspension members, flexible ribbons anchored at their upper ends to the peripheries of said load carrying cam-like members, means connected to the lower ends of said last mentioned ribbons for transmitting the pull of the load to said ribbons, an indicating mechanism, a pair of spindles co-axially arranged relatively to the cam-like members, a linkage pivotally suspended from said spindles, a rack bar pivotally supported from said linkage, a weight indicator and a pinion secured relatively to said weight indicator and adapted to mesh with and be actuated by said rack bar.

3. An indicating and resistant mechanism for use in connection with weighing apparatus comprising a housing, two pairs of cam-like members disposed on opposite sides of the longitudinal axis of said housing, pairs of flexible ribbons secured at their upper ends to said housing and at their lower ends to the peripheries of the cam-like suspension members, a resistant carrying cam-like member fixed relatively to each pair of suspension carrying cam-like members, and having its periphery eccentrically disposed relatively to the peripheries of the cam-like suspension members, a pendulous resistant, a pair of flexible ribbons anchored at their upper ends to the periphery of the resistant carrying cam-like members and at their lower ends to said pendulous resistant, a load carrying cam-like member secured relatively to each pair of cam-like suspension members and having its periphery eccentrically disposed relative to the periphery of the cam-like suspension members each set of cam-like members being co-axially disposed and arranged on the same side of the vertical plane passing through the common axes, flexible ribbons connected at their upper ends to the load carrying cam-like members, means connected to the lower ends of said ribbons for transmitting the pull of the load to said ribbons, an indicating mechanism, a pair of spindles co-axially arranged relative to each of the cam-like members, a linkage pivotally suspended from said spindles, a rack bar pivotally supported from said linkage, a weight indicator, a pinion secured relatively to said weight indicator and adapted to mesh with and be actuated by said rack bar.

4. A weight indicating and resistant mechanism, for use in connection with weighing apparatus, comprising a housing, a plurality of cam-like suspension members, a plurality of flexible ribbons secured at their upper ends to said housing and at their lower ends to the peripheries of the said cam-like suspension members, a pair of resistant carrying cam-like members fixed relatively to the cam-like suspension members and having their peripheries eccentrically disposed relatively to the peripheries of the cam-like suspension members, a pendulous resistant, a pair of flexible ribbons anchored at their upper ends to the peripheries of the said resistant cam-like members and at their lower ends to said pendulous resistant, a pair of load carrying cam-like members fixed relatively to said suspension and resistant carrying cam-like members, flexible ribbons anchored at their upper end to the peripheries of said load carrying cam-like members means connected to the lower ends of said last mentioned ribbons for transmitting the pull of the load to said flexible ribbons, an indicating mechanism, means connected with said cam-like members for actuating the said indicating mechanism, and means for absorbing shock between the pendulous resistant and the flexible ribbons from which it is suspended.

5. A weight indicating and resistant mechanism for use in connection with weighing apparatus, comprising a housing, a plurality of cam-like suspension members, a plurality of flexible ribbons secured at their upper ends to said housing, and at their lower ends to the peripheries of the cam-like suspension members, a pair of resistant carrying cam-like members fixed relatively to the cam-like suspension members and having their peripheries eccentrically disposed relatively to the peripheries of the cam-like suspension members, a pair of flexible ribbons anchored at their upper ends to the peripheries of the said cam-like members, a bar anchored to the other ends of said ribbons, spindles connected to and depending from the said bar, a pendulous resistant, apertures formed in said resistant, coil springs located within said apertures, heads fixed on the lower ends of said spindles and adapted to abut the lower ends of the coil springs said springs constituting a shock absorption means between the resistant and the flexible suspension ribbons therefor, a pair of load-carrying cam-like members fixed relatively to the suspension and resistant carrying cam-like members, flexible ribbons anchored at their upper ends to the peripheries of said load carrying cam-like members, means connected to the lower ends of said last mentioned ribbons for transmitting the pull of the load to said flexible ribbons, an indicating mechanism, and means connected with said cam-like members for actuating the said indicating mechanism.

In testimony whereof, I have signed my name to this specification.

WILLIAM TIMSON.